Feb. 6, 1951   L. J. TUREK   2,540,306
HEAT DISSIPATING HANDLE INSULATOR
Filed Feb. 12, 1946

INVENTOR.
LADD JOHN TUREK
BY
ATTORNEYS

Patented Feb. 6, 1951

2,540,306

UNITED STATES PATENT OFFICE 2,540,306

HEAT DISSIPATING HANDLE INSULATOR

Ladd J. Turek, Inglewood, Calif.

Application February 12, 1946, Serial No. 647,027

1 Claim. (Cl. 16—116)

The present invention relates to new and useful improvements in handles for cooking vessels and lids therefor, as well as handles of oven doors, furnaces, and various types of heaters and other devices and equipment subjected to heat, and the invention has for its primary object to provide novel means for insulating the handle against heat.

More specifically, the invention embodies the provision of a plurality of cooling fins positioned between the handle and the object to which it is attached and arranged to provide a circulation of air between the fins to dissipate the heat before reaching the handle.

A further object of the invention is to provide a device of this character of simple and practical construction, which is efficient and reliable in use, neat and attractive in appearance, inexpensive to manufacture and otherwise well adapted for the purposes for which the same is intended.

Other objects and advantages reside in the details of construction and operation, as more fully hereinafter described and claimed, reference being had to the accompanying drawing forming part hereof, wherein like numerals refer to like parts throughout, and wherein:

Figure 1:
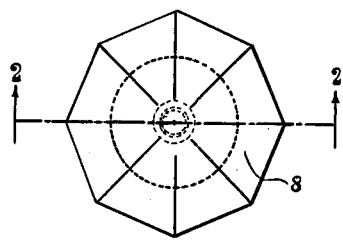
Figure 1 is a top plan view of a knob embodying one form of handle equipped with my invention.

Referring to the drawing in detail, wherein for the purpose of illustration I have disclosed a preferred embodiment of the invention, the numeral 5 designates a conventional form of screw on which is positioned a plurality of cooling fins 6 separated from each other by spacing washers 7.

The fins 6 may be constructed of relatively thin aluminum discs or other suitable metal or material, and the spacers 7 may be constructed of plastic or other suitable material of low heat conductivity.

The screw 5 may be threaded into a knob 8 for attaching the knob to the lid of a cooking vessel with the cooling fins and washers positioned between the knob and the outer surface of the lid.

The fins 6 are of a diameter greater than the diameter of the washers 7 whereby to provide for the circulation of air between the fins, the fins and washers thus serving to dissipate heat before the same is transmitted from the lid to the knob, the knob thus being maintained in a relatively cool condition so as to permit grasping of the knob by the bare fingers of a person.

Figure 3:
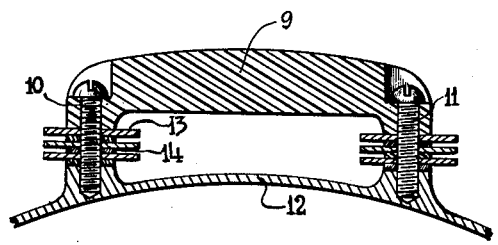
Figure 3 is a vertical sectional view of a handle construction having each end equipped with my invention.
Figure 2:
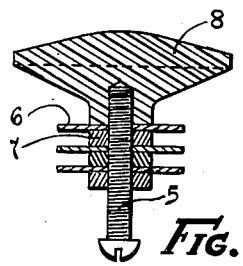
Figure 2 is a vertical sectional view taken on a line 2—2 of Figure 1.

In Figure 3 of the drawing I have illustrated the invention positioned at the ends of a horizontal handle 9 and in which a pair of screws 10 and 11 are used for attaching the ends of the handle to the lid 12. The cooling fins are shown at 13 positioned on the screws and between which the spacing washers 14 are placed for separating the fins.

Figure 4:
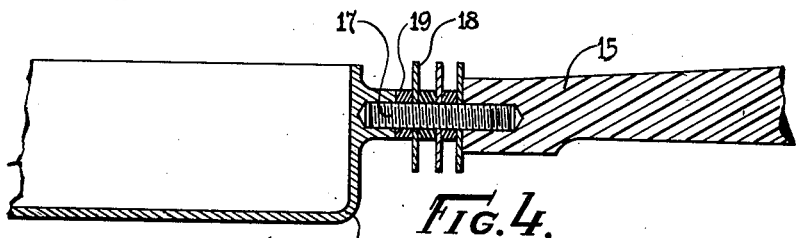
Figure 4 is a fragmentary longitudinal sectional view of a modified type of handle.

In Figure 4 the invention is shown in position between the handle 15 and frying pan or other cooking vessel 16, the handle being secured to the vessel by means of a pin 17 having its ends recessed respectively in the handle and the vessel and on which the cooling fins 18 and spacing washers 19 are positioned between the inner end of the handle and the vessel. It will be understood that the pin 17 may be threaded in the handle and vessel, if desired.

Figures 5, 6:
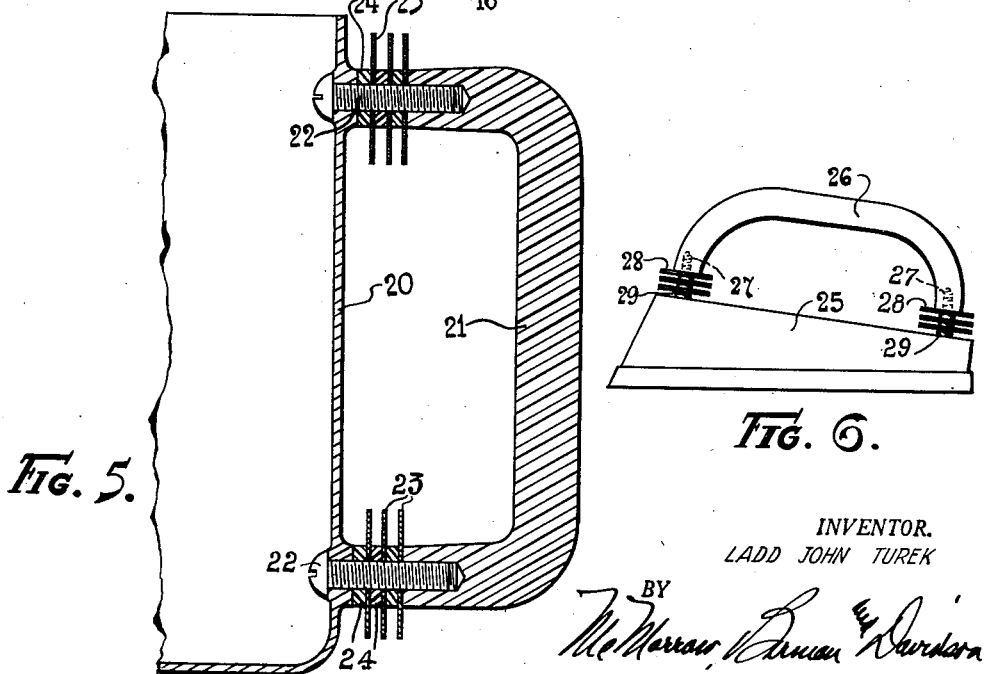
Figure 5 is a sectional view of a handle attached in vertical position to a vessel.
Figure 6 is a side elevational view illustrating the use of the invention on an electric iron.

Figure 5 illustrates a relatively deep cooking vessel 20 to which a U-shaped handle 21 is attached in vertical position, the handle in this instance being attached by means of screws 22 at each end of the handle and on which the cooling fins 23 and spacing washers 24 are positioned between the ends of the handle and the vessel.

Figure 6 illustrates a conventional form of electric iron 25 provided with a handle 26 having its ends attached to the iron by means of screws 27 on which cooling fins 28 and spacing washers 29 are positioned.

From the foregoing it is believed the construction and manner of use of the invention will be apparent to those skilled in the art, and while I have illustrated the several parts of the invention constructed as separate units, it will be understood that the cooling fins, spacing washers and screw or attaching pin may be integrally cast, forged or machined as a unit.

It will also be understood that the invention may be used as a heat-insulation means for the handle of any type of article subjected to heat, and in which it is desired to dissipate the heat before contact with the handle.

It is believed that the details of construction, manner of use and advantages of the device will be readily understood from the foregoing without further detailed explanation.

It is to be understood, however, that even though I have herein shown and described a preferred embodiment of my invention, the same is susceptible of certain changes fully comprehended by the spirit of the invention as herein described, and the scope of the appended claim.

Having thus described the invention, what I claim is:

Heat dissipating means for connecting a handle having a screw threaded socket in one end thereof to a utensil provided with a complementary screw threaded socket comprising a screw threaded element of material of high heat conductivity threaded at its respectively opposite ends into the screw threaded sockets of the utensil and the handle and having a length sufficient to maintain the end of the handle spaced from the utensil, a series of flat washers of material of high heat conductivity on said screw threaded element between the utensil and the handle and having heat conducting contact with said element, said washers being uniformly spaced apart longitudinally of said element and substantially parallel to each other, and spacing washers of material of low heat conductivity on said screw threaded element respectively disposed between adjacent flat washers, said flat washers being larger than said spacing washers and extending outwardly of the latter to provide heat dissipating fins between the utensil and the handle to reduce the transfer of heat along said screw threaded element from the utensil to the handle.

LADD J. TUREK.

REFERENCES CITED

The following references are of record in the file of this patent:

UNITED STATES PATENTS

| Number | Name | Date |
|---|---|---|
| 1,293,849 | Massing | Feb. 11, 1919 |
| 2,197,547 | Haber | Apr. 16, 1940 |
| 2,208,432 | Samuels | July 16, 1940 |
| 2,209,644 | Colby | July 30, 1940 |
| 2,247,826 | Weeks | July 1, 1941 |
| 2,249,620 | Samuels | July 15, 1941 |
| 2,342,692 | Rehm | Feb. 29, 1944 |